US012418124B2

(12) United States Patent
Masaki

(10) Patent No.: US 12,418,124 B2
(45) Date of Patent: Sep. 16, 2025

(54) ELECTRICAL CONNECTOR FOR FLAT-TYPE CONDUCTORS

(71) Applicant: Hirose Electric Co., Ltd., Kanagawa (JP)

(72) Inventor: Shingo Masaki, Kanagawa (JP)

(73) Assignee: HIROSE ELECTRIC CO., LTD., Kanagawa (JP)

(*) Notice: Subject to any disclaimer, the term of this patent is extended or adjusted under 35 U.S.C. 154(b) by 492 days.

(21) Appl. No.: 17/875,292

(22) Filed: Jul. 27, 2022

(65) Prior Publication Data

US 2023/0032779 A1 Feb. 2, 2023

(30) Foreign Application Priority Data

Jul. 30, 2021 (JP) ................................ 2021-125764

(51) Int. Cl.
*H01R 12/88* (2011.01)
*H01R 12/79* (2011.01)

(52) U.S. Cl.
CPC ............ *H01R 12/88* (2013.01); *H01R 12/79* (2013.01)

(58) Field of Classification Search
None
See application file for complete search history.

(56) References Cited

U.S. PATENT DOCUMENTS 7,137,838 B2 * 11/2006 Koga .................... H01R 12/79 439/492
7,766,680 B2 * 8/2010 Suzuki .................. H01R 12/79 439/495

FOREIGN PATENT DOCUMENTS

| | | | |
|---|---|---|---|
| CN | 101345361 | B | 8/2011 |
| JP | 2002190360 | A | 7/2002 |
| JP | 2009021157 | A | 1/2009 |
| JP | 2009064577 | A | 3/2009 |
| JP | 2012212658 | A | 11/2012 |
| JP | 2013187056 | A | 9/2013 |
| TW | 1688170 | B | 3/2020 |

* cited by examiner

*Primary Examiner* — Ross N Gushi
(74) *Attorney, Agent, or Firm* — Procopio, Cory, Hargreaves & Savitch LLP

(57) ABSTRACT

The locking members have an upper arm portion, a mountable portion, and a strut portion; the upper arm portion has a pressure-receiving arm portion and a locking arm portion; the mountable portion has an upper clamping portion and a lower clamping portion that extend in the forward-backward direction, and a coupling portion that couples the upper clamping portion and the lower clamping portion, with the upper clamping portion being resiliently displaceable in the up-down direction, and the mounting portion of the housing being clamped by the upper clamping portion and lower clamping portion in the up-down direction; the strut portion extends upwardly from the upper clamping portion and is coupled to the upper arm portion; the movable member has cam portions located above the pressure-receiving arm portions; and the cam portions depress the pressure-receiving arm portions downward when the movable member moves from the closed position to the open position.

7 Claims, 5 Drawing Sheets

(C)

(A)

(B)

(C)

(A)

(B)

(C)

ELECTRICAL CONNECTOR FOR FLAT-TYPE CONDUCTORS

CROSS-REFERENCE TO RELATED APPLICATIONS

Background

This application claims priority to Japanese Patent Application No. 20021-1.25764, filed Jul. 30, 2021, the contents of which are incorporated herein by reference in its entirety for all purposes.

Technical Field

The present invention relates to an electrical connector for flat-type conductors, to which a flat-type conductor is connected.

Background Art

A connector, into which a strip-shaped flat-type conductor extending in the forward-backward direction and dimensionally thick in the up-down direction is inserted and connected toward the front, has been disclosed in Patent Document 1. Although the description of Patent Document 1 assumes the direction of insertion of the flat-type conductor (signal transmission medium) to be toward the rear and the direction of extraction to be toward the front, the description herein assumes the direction of insertion of the flat-type conductor to be toward the front and the direction of extraction to be toward the rear. The connector of Patent Document 1 is mounted to a mounting face on a circuit board, and multiple terminals, which are arranged such that the terminal array direction is the strip width direction of the flat-type conductor, are retained in a housing. In addition, locking members used to prevent the decoupling of the flat-type conductor are positioned in the terminal array direction on opposite external sides of the terminal array range and are retained in the housing.

The locking members have a movable beam portion that extends in the forward-backward direction along the top wall of the housing and can be resiliently displaced in the up-down direction, a fixed beam portion that extends in the forward-backward direction along the bottom wall of the housing and is mounted to said bottom wall, and a coupling strut portion that couples the intermediate portions of the movable beam portion and the fixed beam portion in the forward-backward direction. Engaging locking portions that can engage the flat-type conductor are provided in a downwardly protruding fashion in the rear end portions of the movable bean portions. The engaging locking portions enter cut-out portions (engagement position-setting portions) formed in both edges of the front end portion of the flat-type conductor from above and are positioned so as to permit engagement from the rear with engageable portions located in front of said cut-out portions, thereby preventing rearward decoupling of the flat-type conductor. The front end portions of the movable beam portions are provided with actuating unlocking portions used for disengaging the engaging locking portions. In addition, at a location directly above the actuating unlocking portions, the housing has an actuating locking cover portion that can be resiliently displaced in the up-down direction.

According to Patent Document 1, when the hoot-type conductor is inserted, the front end portion of the flat-type conductor abuts the engaging locking portions of the locking members and lifts said engaging locking portions up. At such time, as a result of rocking motion about the coupling strut portion or the vicinity thereof as a pivotal center, the movable beam portion is resiliently displaced and further insertion of the flat-type conductor is allowed. Furthermore, when the flat-type conductor is inserted to yard the front and the cut-out portions of the flat-type conductor reach the locations of the engaging locking portions, under the action of the resilient restoring force of the movable beam portions, the engaging locking portions enter the cut-out portions from above and are positioned so as to permit engagement with the engageable portions.

In addition, when the flat-type conductor is extracted, as a result of performing an unlocking operation during which the actuating locking cover portion of the housing is downwardly depressed, said actuating locking cover portion depresses the actuating unlocking portions of the locking members, and the movable beam portions effect rocking motion in the same manner as during the above-described flat-type conductor insertion process. As a result, the engaging locking portions move upward and said engaging locking portions are disengaged from the engageable portions of the flat-type conductor, thereby allowing rearward extraction of the flat-type conductor.

RELATED ART DOCUMENTS

Patent Documents

[Patent Documents 1]
Japanese Published Patent Application No. 2012-212658

SUMMARY

Problems to be Solved

It is an object of the present disclosure to ensure a long spring length for the locking members or terminals without increasing the size of the connector.

If the insertion and extraction of the flat-type conductor is allowed by the resilient displacement of the movable beam portions of the locking members, as in Patent Document 1, ensuring that the movable beam portions and coupling strut portions have a long resiliently deformable length, that is, the spring length, makes it possible for the movable beam portions to be resiliently displaced by a small force, thereby facilitating the operation of insertion and the operation of unlocking of the flat-type conductor. However, while said spring length can be increased if movable beam portions and coupling strut portions of greater length are, formed, this leads to an increase in the size of the locking members and, by extension, the connector, which is undesirable.

In addition, in some electrical connectors for flat-type conductors, a shape including a movable beam portion, a fixed beam portion, and a coupling strut portion may be employed for the terminals, in a manner similar to the locking members of Patent Document 1 described above. In such a case, contact portions formed on the rear end side of the movable beam portions alt brought into contact with the circuits of the flat-type conductor inserted into the connector under contact pressure from above. In addition, when the flat-type conductor is extracted, pressure-receiving portions formed on the front end side of the movable beam portions are depressed from above, as a result of which the movable beams effect t roe king motion and the contact portions move upward, such that contact between said contact portions and the circuits of the flat-type conductor is interrupted and rearward extraction of the flat-type conductor is allowed. While increasing the spring length is desirable even if the terminals are shaped in such a manner, attempts at increasing the spring length by forming movable beam portions and coupling strut portions of greater length bring about an increase in the size of the terminals and, by extension, the connector.

In view of such circumstances, it is an object of the present invention to provide an electrical connector for flat-type conductors in which it is possible to ensure that the locking members or terminals have a long spring length without increasing the size of the connector.

Technical Solution

In accordance with the present invention, the above-described problem is solved by the electrical connectors for flat-type conductors according to the following first invention and second invention.

First Invention

The electrical connector for flat-type conductors according to the first invention is an electrical connector for flat-type conductors to which a flat-type conductor extending in the forward-backward direction and dimensionally thick in the up-down direction is connected, wherein said connector comprises a housing that has formed therein a receiving space open toward the rear for forward insertion of the flat-type conductor, multiple terminals that are arranged and retained in the housing such that the terminal array direction is a direction perpendicular to both the forward-backward direction and the up-down direction, locking members that are disposed outside the array range of the terminals in the terminal array direction and retained in the housing, and a movable member that is provided forwardly of the receiving space and is capable of moving between a closed position and an open position while pivoting about a pivoting axis extending in the terminal array direction, extraction of the flat-type conductor is prevented when the movable member is in the closed position, and extraction of the flat-type conductor is permitted when the movable member is in the open position.

In such an electrical connector for flat-type conductors, in the first invention, the locking members have an upper arm portion that extends in the forward-backward direction upwardly of the receiving space, a mountable portion that is mounted to the housing at a location downward of the upper arm portion and forward of the receiving space, a strut portion that extends upwardly from the mountable portion and is coupled to the upper arm portion; the upper arm portion has a pressure-receiving arm portion that extends forwardly from the top end of the strut portion, and a locking arm portion that extends rearwardly from the top end of the strut portion; the locking arm portion has an engaging portion positioned so as to permit engagement from the rear with an engageable portion in the flat-type conductor when the movable member is in the closed position; the mountable portion has an upper clamping portion and a lower clamping portion that are spaced apart from each other in the up-down direction and extend in the forward-backward direction, and a coupling portion that couples the front end portions of the upper clamping portion and lower clamping portion; the upper clamping portion is resiliently displaceable in the up-down direction and the mounting portion formed as part of the housing, is clamped by the upper clamping portion and lower clamping portion in the up-down direction; the strut portion extends upward from the upper clamping portion; the movable member has a cam portion located above the pressure-receiving arm portion; and, the cam portion depresses the pressure-receiving arm portion downward when the movable member moves from the closed position to the open position.

In the first invention, the locking arm portion, strut portion, and upper clamping portion of the locking member are resiliently displaceable, and the spring length is the length of the range comprising these sections. During insertion of the flat-type conductor, when the front end portion of the flat-type conductor abuts the engaging portions of the locking members and lifts said engaging portions up, the locking arm portions, strut portions, and upper clamping portions are resiliently displaced upward, with the coupling portions serving as a fulcrum, and, as a result, further insertion of the flat-type conductor is allowed. In addition, during extraction of the flat-type conductor, as the movable member moves to the open position, the cam portion of the movable member depresses the pressure-receiving portions, and, as a result, in the same manner as during insertion of the flat-type conductor, the locking arm portions, strut portions, and upper clamping portions are resiliently displaced upward. As a result, the engaging portions of the locking arm portions are disengaged from the flat-type conductor, thereby alloying extraction of the flat-type conductor.

In the first invention, resilient displacement is made possible not only in the locking arm portion and the strut portion, but also in the upper clamping portion of the mountable portion, which ensures a correspondingly longer spring length. Further, since the upper clamping portion, which forms part of the mountable portion used for mounting the locking members to the housing, is employed as a resiliently displaceable section, there is no need to provide new sections in the locking members, or make the locking arm portions or strut portions longer in order to increase the spring length, and there is no increase in connector size.

In the first invention, the electrical connector for flat-type conductors is mountable to a mounting face of a circuit board using solder connections, and the locking members may have an anchor portion that extends toward the front from the mountable portion and is anchored to the mounting face of the circuit board using solder connections.

In the first invention, in the process of insertion and extraction of the flat-type conductor, the upper clamping portion of the locking member, which forms part of the mountable portion, is resiliently displaced upward along with the locking arm portion and the strut portion. If, at such time, the lower clamping portion is displaced upward along with the upper clamping portion, the clamping force with which the mounting portion of the housing is clamped by the upper clamping portion and lower clamping portion, in other words, the strength of attachment of the mountable portion to the housing, is unlikely to decrease. However, should the upper clamping portion and lower clamping portion become spaced apart if, for instance, the lower clamping portion is not displaced upward and only the upper clamping portion is displaced upward, then the above-mentioned clamping force, that is, the strength of attachment of the mountable portion, n ray be slightly decreased.

However, if in the first invention the electrical connector for flat-type conductors is mountable to a mounting face on as circuit board, the operations of insertion and extraction of the flat-type conductor are performed after mounting to the mounting face of the circuit board, that is, after securing the anchor portions of the locking members to the mounting face of the circuit board using solder connections. Therefore, even if the upper clamping portion and lower clamping portion of the mountable portion become spaced apart and the above-mentioned clamping for that is, the strength of attachment to the housing, is slightly decreased, the locking members will not become decoupled from the housing because the position of the locking members relative to the circuit board will have already been fixed at that point in time.

<Second Invention>

The electrical connector for flat-type conductors according to the second invention is an electrical connector for flat-type conductors to which a flat-type conductor extending in the forward-backward direction and dimensionally thick in the up-down direction is connected, wherein said connector comprises a housing that has formed therein a receiving space open toward the rear for forward insertion of a flat-type conductor, multiple terminals that are arranged and retained in the housing such that the terminal array direction is a direction perpendicular to both the forward-backward direction and the up-down direction, and a movable member that is provided forwardly of the receiving space and is capable of moving between a closed position and an open position while pivoting about a pivoting axis extending in the terminal array direction.

In such an electrical connector for flat-type conductors, in the second invention, the terminals have an upper arm portion that extends in the forward-backward direction upwardly of the receiving space, a mountable portion that is mounted to the housing at a location downward of the upper arm portion and forward of the receiving space, and a strut portion that extends upwardly from the mountable portion and is coupled to the upper arm portion; the upper arm portion has a pressure-receiving arm portion that extends forwardly from the top end al the strut portion, and a contact arm portion that extends rearwardly from the top end of the strut portion; the contact arm portion has a contact portion that comes into contact with the circuits of the flat-type conductor from above when the movable member is in the closed position; the mountable portion has an upper clamping portion and a lower clamping portion that are spaced apart from each other in the up-down direction and extend in the forward-backward direction, and a coupling portion that couples the front end portions of the upper clamping portion and lower clamping portion; the upper clamping portion is resiliently displaceable in the up-down direction, and the mounting portion, formed as part of the housing, is clamped by the upper clamping portion and lower clamping portion in the up-down direction, the strut portion extends upward from the upper clamping portion; the movable member has a cam portion located above the pressure-receiving arm portion; and the cam portion depresses the pressure-receiving arm portions downward when the movable member moves from the closed position to the open position.

In the second invention, the contact arm portion, strut portion, and upper clamping portion of the terminals are resiliently displaceable, and the spring length is the length of the range comprising these sections. During insertion of the t-type conductor, when the front end portion of the flat-type conductor abuts the contact portions of the contact arm portions and lifts said contact portions up, the contact arm portions, strut portions, and upper clamping portions are resiliently displaced upward, with the coupling portions serving as a fulcrum, and, as a result, further insertion of the flat-type conductor is allowed. In addition, during extraction of the flat-type conductor, as the movable member moves to the open position, the cam portion of the movable member depresses the pressure-receiving portions, as a result of which, in the same manner as during insertion of the flat-type conductor, the contact arm portion, strut portion, and upper clamping portion are resiliently displaced upward. As a result, contact between the contact portions of the contact arm portions and the circuits of the flat-type conductor is interrupted.

In the second invention, resilient displacement is made possible not only in the contact arm portion and the strut portion, but also in the upper clamping portion of the mountable portion, which ensures a correspondingly longer spring length. Further, since the upper clamping portion, which forms part of the mountable portion used for mounting the terminal to the housing, is employed as a resiliently displaceable section, there is no need to provide new sections in the terminals, or make the contact art portions or strut portions longer in order to increase the spring length, and there is no increase in connector size.

In the second invention, the electrical connector for lat-type conductors is mountable to a mounting face on a circuit board using solder connections, and the terminals may have an anchor portion that extends toward the front from the mountable portion and is anchored to the mounting face of the circuit board using solder connections.

In the second invention, in the process of insertion and extraction of the flat-type conductor, the upper clamping portion of the terminals, which forms part of the mountable portion, is resiliently displaced upward along with the contact arm portion and the strut portion. If, at such time, the lower clamping, portion is displaced upward along with the upper clamping portion, the clamping force with which the mounting portion of the housing is clamped by the upper clamping portion and lower clamping portion, in other words, the strength of attachment of the mountable portion to the housing, is unlikely to decrease. However, should the upper clamping portion and lower clamping portion become spaced apart if, for instance, the lower clamping portion is not displaced upward and only the upper clamping portion is displaced upward, then the above-mentioned clamping force, that is, the strength of attachment of the mountable portion, may be slightly decreased.

However, if in the second invention the electrical connector for flat-type conductors is mountable to a mounting face on a circuit board, the operations of insertion and extraction of the flat-type conductor are performed after mounting to the mounting face of the circuit board, that is, after securing the anchor portions of the terminals to the mounting face of the circuit board using solder connections. Therefore, even if the upper clamping portion and lower clamping portion of the mountable portion become spaced apart and the above-mentioned clamping force, that is, the strength of attachment to the housing is slightly decreased, the terminals will not become decoupled from the housing because the position of the terminals relative to the circuit board will have already been fixed at that point in time.

Technical Effect

In the present invention, as described above, in the locking members or terminals, resilient displacement is made possible not only in the arm portions (locking arm portion or contact arm portion) and the strut portion, but also in the upper clamping portion of the mountable portion, which ensures a correspondingly longer spring length. As a result, the operations of insertion and extraction of the flat-type conductor can be accomplished with ease. Further, since in the present invention the upper clamping portion, which forms part of the mountable portion used for mounting the locking members or terminals to the housing, is employed as a resiliently displaceable section, there is no need to provide new sections in the locking members or terminals, or make the arm portions or strut portions longer in order to increase the spring length, and there is 110 increase in connector size.

DETAILED DESCRIPTION

Embodiments of the present invention will be discussed hereinbelow with reference to the accompanying drawings.

Figure 1:
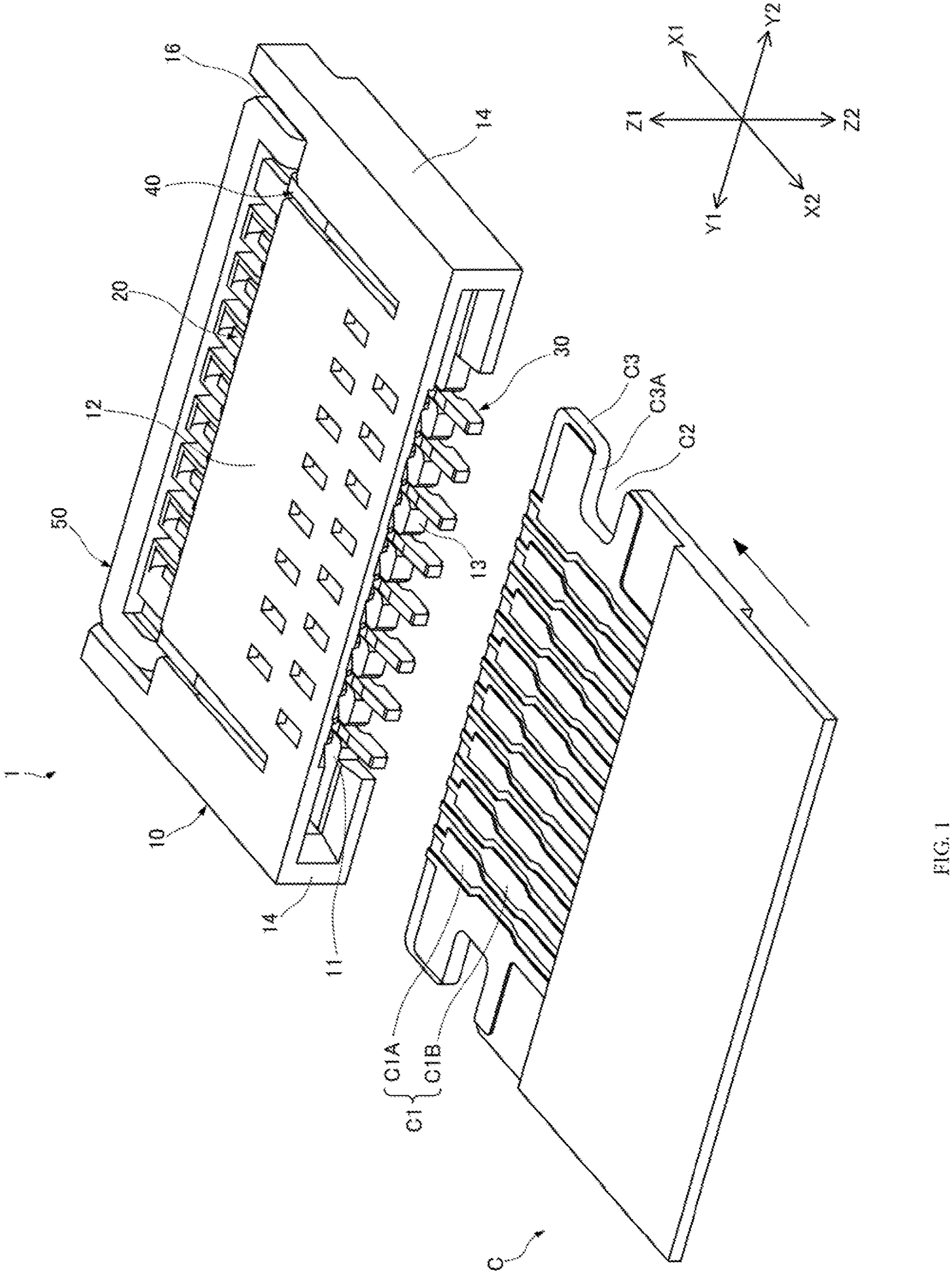
FIG. 1 illustrates a perspective view illustrating an electrical connector for flat-type conductors according to an embodiment of the present invention, shown along with a flat-type conductor.
Figure 2:
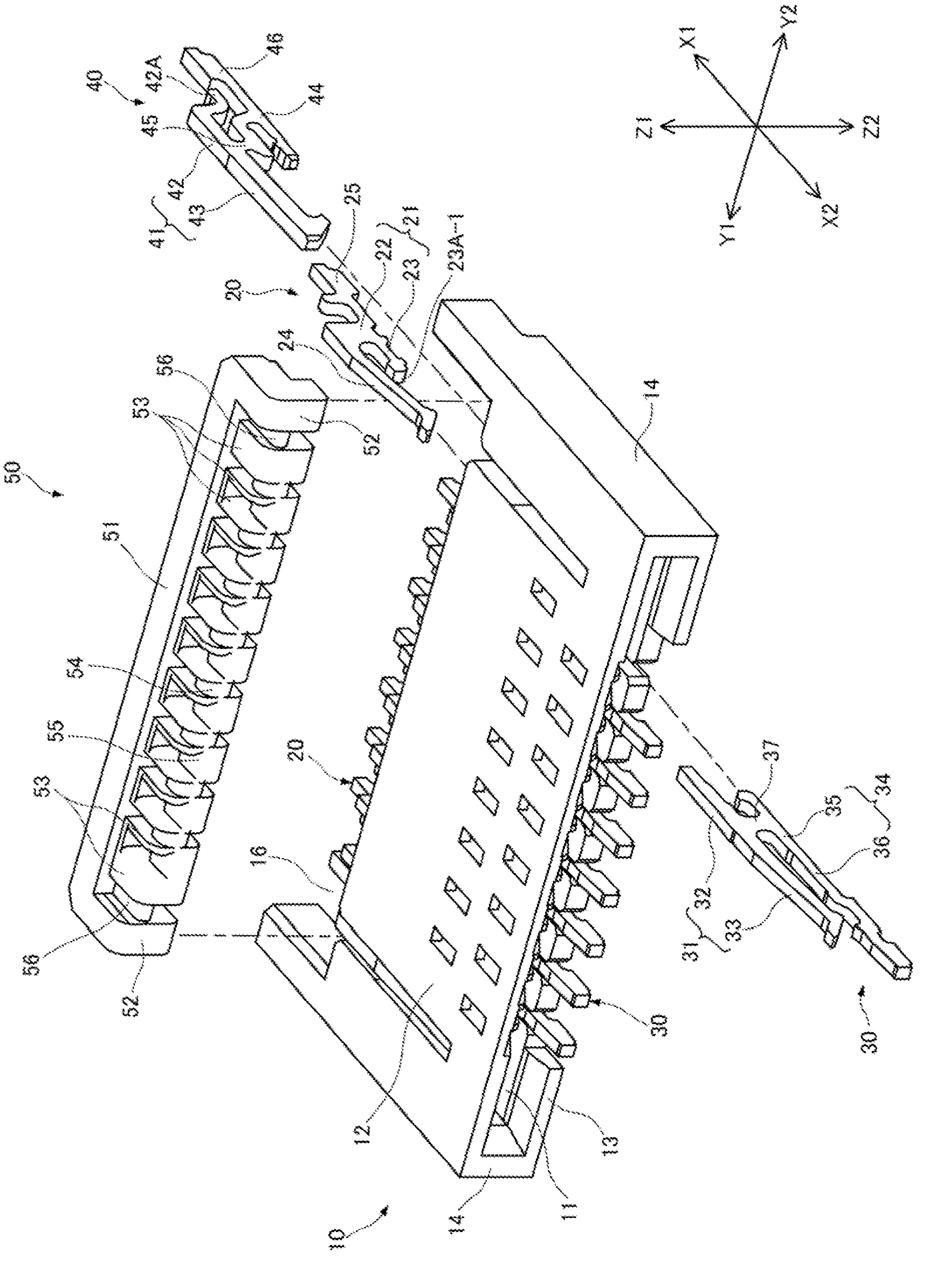
FIG. 2 illustrates a perspective view illustrating the electrical connector for flat-type conductors, with one first terminal, one second terminal, a locking member, and a movable member shown in an exploded condition.
Figure 3:
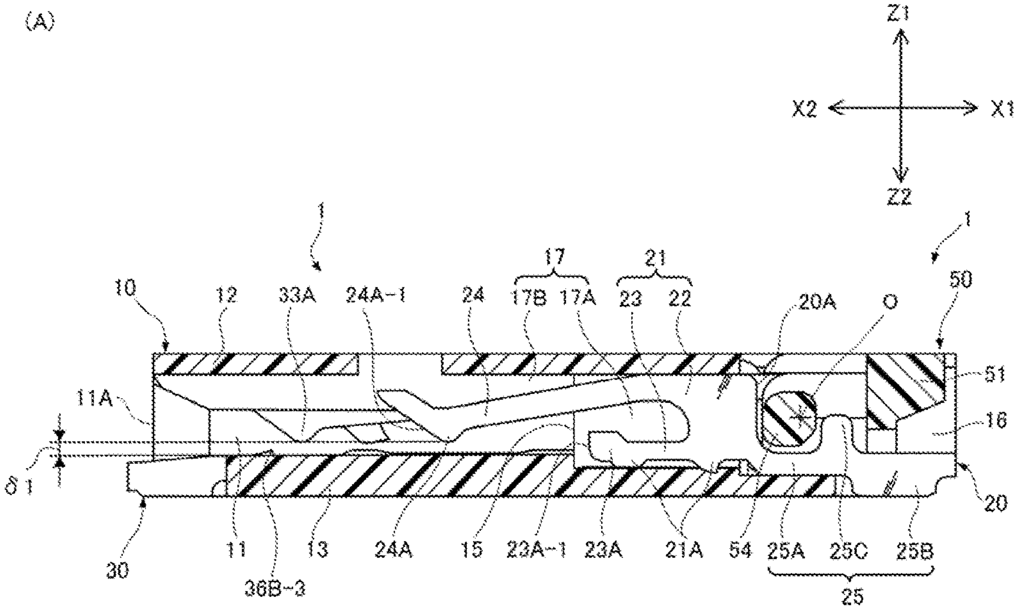
FIGS. 3(A) to 3(C) illustrate a longitudinal cross-sectional view of the electrical connector for flat-type conductors, wherein 3(A) illustrates a cross-section at the location of a first terminal, FIG. 3(B) a cross-section at the location of a second terminal, and FIG. 3(C) a cross-section at the location of a locking member.
Figure 3:
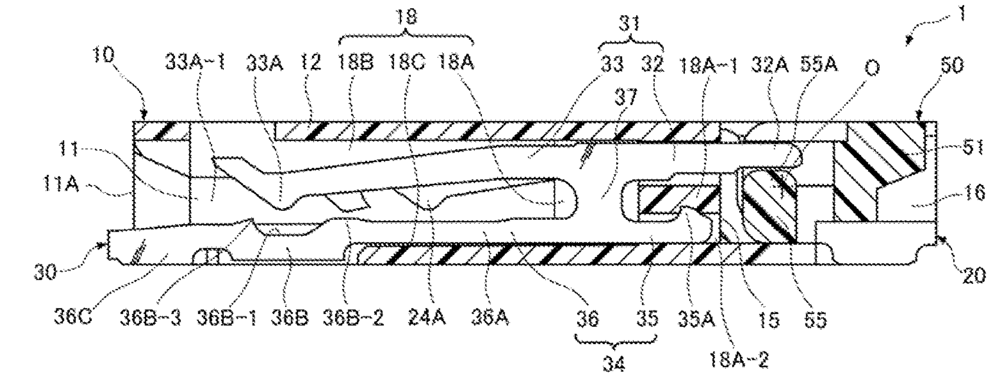
Figure 3:
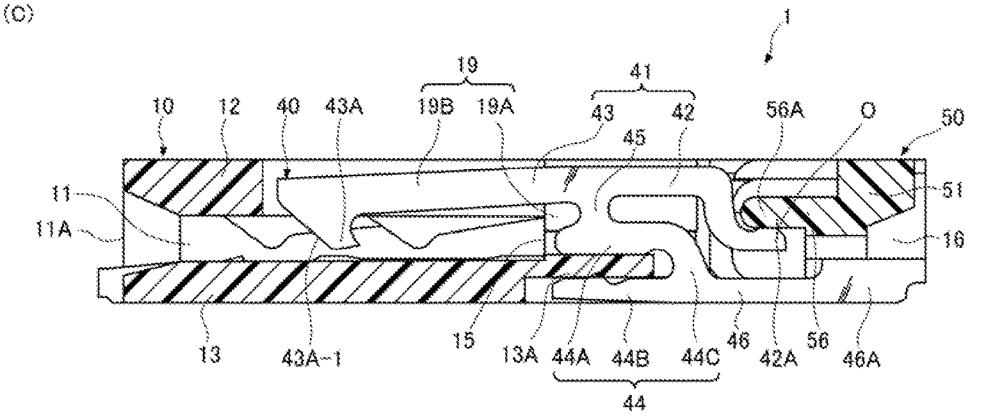

FIG. 1 is a perspective view of the electrical connector for flat-type conductors 1 (hereinafter referred to as "connector 1") according to the present embodiment. FIG. 2 is a perspective view illustrating the connector 1, with one first terminal 20, one second terminal 30, a locking member 40, and a movable member 50 shown in an exploded condition FIG. 3(A) to 3 (C) show longitudinal cross-sectional views of the connector 1 wherein FIG. 3(A) illustrates cross-section at the location of a first terminal 20, FIG. 3(B) a cross-section at the location of a second terminal 30, FIG. 3(C) a cross-section at the location of a locking member 40.

The connector 1 is mounted to a mounting face on a circuit board (not shown), and a flat-type conductor C (e.g, FPC) serving as a counterpart connect body, is adapted to be connected thereto so as to permit insertion and extraction such that the direction of insertion and extraction is a forward-backward direction (X-axis direction) parallel to said mounting face. The connector 1 puts the circuit hoard and the flat-type conductor C in electrical communication when the flat-type conductor C is connected. In the present embodiment, the X-axis direction (forward-backward direction), direction X1 is toward the front and direction X2 is toward the rear. In addition, the connector width direction is the Y-axis direction, which is perpendicular to the forward-backward direction (X-axis direction) in a plane (XY plane) parallel to the mounting face of the circuit board, and the connector thickness direction is the Z-axis direction (up-down direction), which is perpendicular to the mounting face of the circuit board.

The flat-type conductor C, which extends in the forward-backward direction (X-axis direction) in the form of a flexible strip whose width direction is the connector width direction (Y-axis direction), has multiple circuits extending in the forward-backward direction formed in an array in the connector width direction. Said circuits are embedded within an insulating layer in the flat-type conductor C and extend in the forward-backward direction all the way to the front end of the flat-type conductor C. In addition, the above-mentioned circuits include connecting circuits C1 whose top face of the flat-type conductor C in its front end section is exposed, and can be brought into contact with first terminals 20 and second terminals 30 in the connector 1, to be described below. The connecting circuits C1 include first circuits CIA, which are in contact with the first terminals 20, and second circuits C1B, which are in contact with the second terminals 30, with the two types of circuits positioned alternately in the connector width direction while being offset in the forward-backward direction.

Further, the flat-type conductor C has cut-out portions C2 formed in the opposite side edges of the above-mentioned front end section, and the rear end edges of ears C3, which are located forwardly of said cut-out portions C2, operate as engageable portions C3A engaging the engaging portions 43A, to be described below, of the connector 1 (see FIG. 4(C)).

The connector 1 comprises a housing 10 made of plastic or another electrically insulating material, multiple first terminals 20 and second terminals 30 of sheet metal arranged such that the terminal array direction is the connector wait direction and retained in the housing 10, locking members 40 of sheet metal arranged on opposite external sides of the terminal array range in the connector width direction, and a movable member 50 made of plastic or another electrically insulating material that can pivot between a closed position and an open position, to be described below, and the flat-type conductor C is adapted to be inserted and connected thereto from the rear.

The housing 10, as shown in FIGS. 1, 2, has a substantially rectangular parallelepiped-like exterior configuration whose longitudinal direction is the connector width direction, and a receiving space 11 used to receive the flat-type conductor C is formed therein as a rearwardly open space. As show in FIG. 2, the housing 10 has a top wall 12 and a bottom wall 13 that extend parallel to the mounting face of the circuit board, two side walls 14 that extend in the up-down direction and couple the opposite end portions of the top wall 12 and the bottom wall 13 in the connector width direction, and a front wall 15 that couples the front ends of the top wall 12 and the bottom wall 13 (see FIGS. 3(A) to 3(C)). A movable member accommodating space 16 for accommodating the movable member 50 is formed forwardly of the front wall 15 between the two side walls 14 in the connector width direction.

Figure 4:
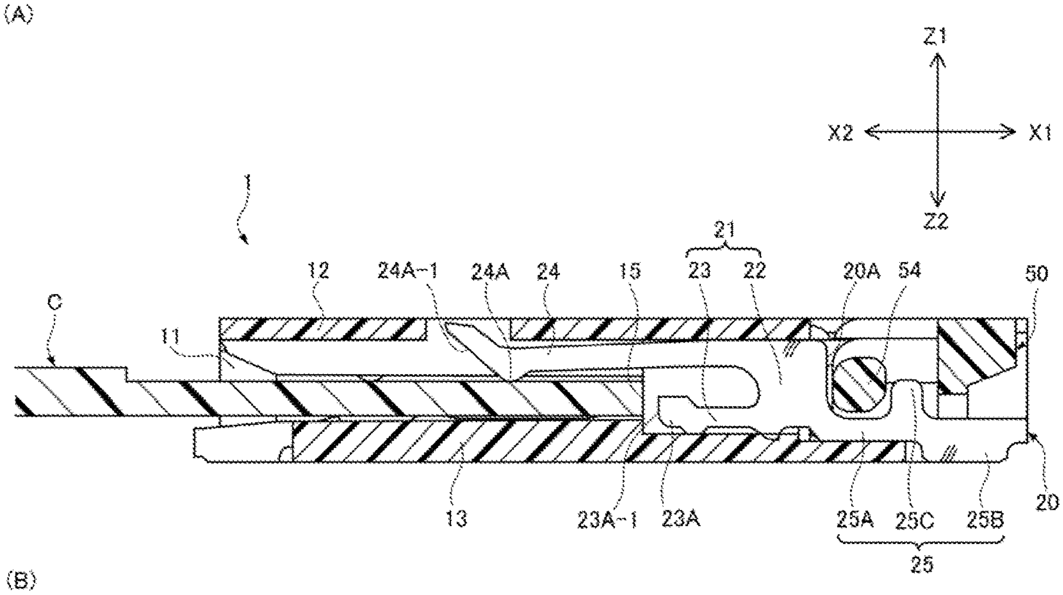
FIGS. 4(A) to 4(C) illustrate a longitudinal cross-sectional view of the electrical connector for flat-type conductors upon completion of insertion of the flat-type conductor, wherein FIG. 4 (A) illustrates a cross-section at the location of a first terminal, FIG. 4(B) a cross-section at the location of a second terminal, and FIG. 4(C) a cross-section at the location of a locking member.
Figure 4:
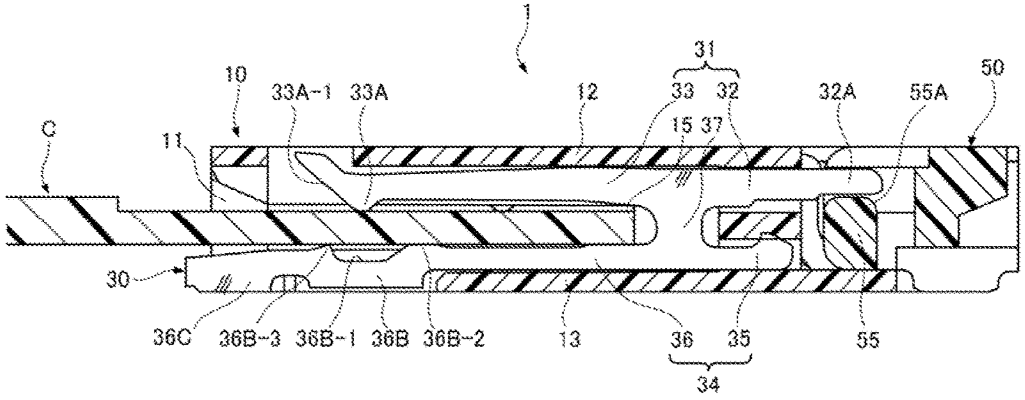
Figure 4:
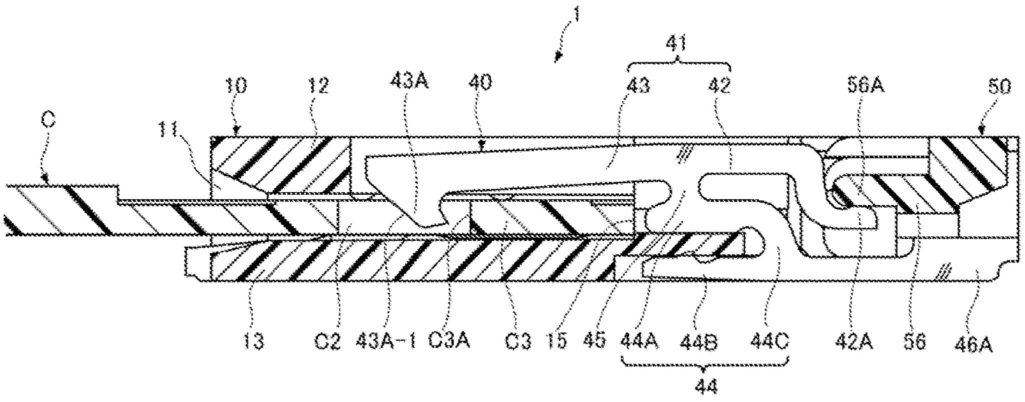

The receiving space 11, which has a rear end opening 11A that is enclosed by the top wall 12, the bottom wall 13, and the two side walls 14 and forms an insertion aperture for the flat-type conductor C (see FIGS. 3(A) to 3(C)) in the rear end face of the housing 10, is adapted to receive the front end section of the flat-type conductor C within a space extending from the rear end opening 11A to the rear face of the front wall 15 in the forward-backward direction (see FIGS. 4 (A) to 4(C)).

Along with being in a face-to-face relationship with the mounting face of the circuit board at a location below the top wall 12, the bottom wall 13 has its rear end within the terminal array range in the connector width direction (Y-axis direction) positioned slightly forwardly of the rear end of the top wall 12 (see FIG. 1 and FIG. 2). In addition, within the terminal array range in the connector width direction, the bottom wall 13 has its front end portion projecting into the movable member accommodating space 16 (see FIGS. 3(A) and 3(B)). On the other hand, at locations corresponding to the locking members 40 outside the terminal array range in the connector width direction, the front end portion of the bottom wall 13 is positioned rearwardly of the front face of the front wall 15 (see FIG. 3(C)). In addition, at a location corresponding to the locking member 40, the front end portion of the bottom wall 13 has its bottom face recessed, thereby making it thinner than other portions, and is formed as a mounting portion 13A used for mounting the locking member 40 (see FIG. 3(C)).

In addition, as shown in FIGS. 3(A) and 3(B), a first terminal accommodating portion 17 for accommodating and retaining the first terminals 20 and a second terminal accommodating portion 18 for accommodating and retaining the second terminals 30 are formed in the housing 10. The first terminal accommodating portion 17 and second terminal accommodating portion 18 are arranged alternatingly at predetermined intervals in the connector width direction. In addition, as shown in FIG. 3(C), locking member accommodating portions 19 for accommodating and retaining the locking members 40 are formed in the housing 10 at the opposite ends of the receiving space 11 in the connector width direction, in other words, on opposite external skies of the terminal array range.

As seen in FIG. 3(A), the first terminal accommodating portion 17 has a front groove portion 17A serving as a front space that has a slit-shaped configuration extending at right angles to the connector width direction and is used for accommodating and retaining by press-fitting the front end section of the first contact arm portion 24 and the base portion 21, to be described below, of the first terminals 20, and an upper groove portion 17B that accommodates the rear end section of the first contact arm portion 24, to be described below, of the first terminals 20. The front groove portion 17A is formed to extend in the forward-backward direction within a range extending from the top wall 12 to the bottom wall 13 in the up-down direction. Recessed from the bottom face of the top wall 12, the upper groove portion 17B extends from the front groove portion 17A toward the rear. In addition, as seen in FIG. 3(A), while being open toward the rear and downward, the upper groove portion 17B passes through the top wall 12 in the up-down direction at a location corresponding to the rear end portion of the first contact arm portion 24 in the forward-backward direction.

As seen in FIG. 3(B), the second terminal accommodating portion 18 has a front groove portion 18A that has a slit-shaped configuration extending at right angles to the connector width direction and is used for accommodating and retaining by press-fitting the front end section of the lower arm portion 34, the front end section of the upper arm portion 31, and the strut portion 37, to be described below, of the second terminals 30, an upper groove portion 18B accommodating the rear end section of the upper arm portion 31, to be described below, of the second terminals 30, and a lower groove portion 18C accommodating the rear end section of the lower arm portion 34, to be described below, of the second terminals 30.

The front groove portion 18A is formed to pass in the forward-backward direction within a range extending from the top wall 12 to the bottom wall 13 in the up-down direction. As seen in FIG. 3(B), within the front groove portion 18A, a second terminal retaining portion 18A-1 used for retaining the second terminal 30 by press-listing is formed so as to couple the opposed interior groove surfaces (two surfaces facing each other in the connector width direction) of the front groove portion 18A at a vertically intermediate position in the front half of the front groove 18A. A press-fitting groove 18A-2 used for retaining the retained arm portion 35 by press-fitting is formed in the forward-backward director between the second terminal retaining portion 18A-1 and the bottom wall 13. Recessed from the bottom face of the top wall 12, the upper groove portion 18B extends from the front groove portion 18A toward the rear. In addition, as seen in FIG. 3(B), while being open toward the rear and downward, the upper groove portion 18B extends through the top wall 12 in the up-down direction at a location corresponding to the rear end portion of the upper arm portion 31 in the forward-backward direction. As seen in FIG. 3(B), at a location proximate to the rear end, the lower groove portion 18C extends through the bottom wall 13 in the up-down direction at a location corresponding to the hereinafter-described reinforcing portion 36B of the lower arm portion 34.

As shown in FIG. 3(C), the locking member accommodating portion 19 has a front groove portion 19A that has a slit-shaped configuration extending at right angles to the connector width direction and is used to accommodate by press-fitting the mountable portion 44, the front end section of the upper arm portion 41, and the strut portion 45, to be described below, of the locking member 40, and an upper groove portion 19B that accommodates the rear end section of the upper arm portion 41 of the locking member 40. The front groove portion 19A is formed so as to extend in the forward-backward direction throughout the full extent of the housing 10 in the up-down direction. As show in FIG. 3(C), a mounting portion. 13A, which constitutes the front end portion of the bottom wall 13, enters from the rear and extends at the bottom of the front groove 19A. The mounting portion 13A is formed so as to couple the opposed interior groove surfaces (surfaces facing each other in the connector width direction) of the front groove portion 19A. As shown in FIG. 3(C), the upper groove portion 19B, which extends in the forward-backward direction to a location proximate to the rear end of the top wall 12, extends through the top wall 12 in the up-down direction throughout the full extent in the forward-backward direction.

The first terminals 20, which are fabricated by punching from metal plate members while keeping their major faces (rolled surface) flat, are accommodated within the first terminal accommodating portions 17 of the housing 10, as illustrated in FIG. 3(A), as a result of which the major faces of all the first terminals 20 are arranged and retained in the housing 10 at right angles to the connector width direction (Y-axis direction).

The first terminals 20 are press-fitting mounted to the housing 10 from the front. As illustrated in FIG. 3(A), the first terminals 20 have a base portion 21 that is press-fittingly retained in the front groove portion 17A of the housing 10, a first contact arm portion 24 that extends toward the rear from the rear edge of the base portion 21 through the front groove portion 17A and the upper groove portion 17B, and a projecting arm portion 25 that extends toward front from the front edge of the bottom portion of the base portion 21 and projects into the movable member accommodating space 16.

The first contact arm portion 24, which extends slopingly downward as one moves rearward, is resiliently displaceable in the up-down direction. A first contact portion 24A, which can be brought into contact with the first circuit C1A on the flat-type conductor C from above, is provided in a downwardly protruding configuration in the rear end portion of the first contact arm portion 24. The first contact portion 24A, which is located within the receiving space 11, faces the interior surface of the receiving space 11, in other words, the top face of the bottom wall 13 across a gap δ1 in the up-down direction (Z-axis direction), which is the connector thickness direction. The rear end face of the first contact portion 24A, which slopes downward as one moves forward, forms a first guide face 24A-1 used for forwardly guiding the flat-type conductor C. The bottom portion of the first guide face 24A-1 constitutes the rear end face of the first contact portion 24A.

At the top and bottom edges of the base portion 21, the base portion 21, which has two press-fit protrusions 21A formed at the bottom edge, is press-fittingly retained by the upper interior wall surface and lower interior wall surface of the front groove portion 17A. The base portion 21 has a retained portion 22 that is formed and retained with dimensions encompassing the full extent of the front groove portion 17A in the up-down direction, and an extension portion 23 that extends toward the rear along the first contact arm portion 24 from the rear edge of the bottom portion of the retained portion 22.

The extension portion 23, which is made shorter than the first contact arm portion 24 in the forward-backward direction, is accommodated within the front groove portion 17A in its entirety and has a reflective portion 23A in its rear end portion. In the present embodiment, light emitted forwardly in the receiving space 11 during post-production inspection of the connector can be reflected back by the reflective portions 23A. The reflective portions 23A are formed as reflecting surfaces 23A-1, whose rear end faces (through-thickness faces) are flat surfaces perpendicular to the forward-backward direction.

In the present embodiment, the reflecting surface 23A-1 is formed having the same dimensions as the gap 61 in the connector width direction while having dimensions exceeding the gap 61 in the up-down direction. Specifically, in the up-down direction, the reflecting surface 23A-1 is positioned so as to include the protruding end (bottom end) of the first contact portion 24A because the top end of the said reflecting surface 23A-1 is located above said protruding end, and is also positioned so as to include the location of the top face of the bottom wall 13 (interior surface of the receiving space 11) because the bottom end of the said reflecting surface 23A-1 is located below the top face of said bottom wall 13. In other words, when viewed from the rear, the reflecting surface 23A-1 is positioned within a range that includes the entire gap δ1.

Substantially the rear half of the projecting arm portion 25 forms a supported arm portion 25A that extends along the bottom wall 13 and is supported from below by the bottom wall 13. Substantially the front half of the projecting arm portion 25 extends forwardly and downwardly of the front end of the bottom wall 13 and forms a first connecting portion 25B that serves as an anchor portion solder-connected to the circuits (not show the mounting face of the circuit board with its bottom edge portion. In addition, a protruding portion 25C, which protrudes from the top edge of the projecting arm portion 25, is formed at an intermediate location of the projecting arm portion 25 in the forward-backward direction. In the present embodiment, sections made up of the front edge portion of the retained portion 22, the supported arm portion 25A, and the protruding portion 25C are positioned so as to enclose the hereinafter-described first shaft body portions 54 of the movable member 50 from the rear, from below, and from the front, thereby forming first shall restricting portions 20A that restrict the rearward, downward, and forward movement of the first shaft body portions 54.

The second terminals 30, which are fabricated by punching from metal plate members while keeping their major faces (rolled surface) flat, are accommodated within the second terminal accommodating portions 18 of the housing 10, as illustrated in FIG. 3(B), as a result of which the major faces of all the second terminals 30 are arranged and retained in the housing 10 at right angles to the connector width direction (Y-axis direction).

The second terminals 30 are press-fittingly mounted to the housing 10 from the rear. As illustrated in FIG. 3(B), the second terminals 30 have an upper arm portion 31 that extends in the forward-backward direction along the top wall 12, a lower arm portion 34 that is positioned downwardly of the upper arm portion 31 and extends in the forward-backward direction along the bottom wall 13, and a strut portion 37 that extends in the up-down direction and couples the intermediate portions of the upper arm portion 31 and the lower arm portion 34 in the forward-backward direction.

The upper arm portion 31 has a restricting arm portion 32 that extends toward the front from the top end of the strut portion 37, and a second contact arm portion 33 that extends toward the rear from the top end of the strut portion 37. The restricting arm portions 32, which have their front end portions projecting into the movable member accommodating space 16, form second shaft restricting portions 32A located above the hereinafter-described second shaft body portions 55 of the movable member 50. The second shaft restricting portions 32A, which are positioned at a slight gap from the second shaft body portions 55 in the up-down direction, restrict the upward movement of the second shaft body portions 55. In the present embodiment, the previously discussed first shaft restricting portions 20A of the first terminals 20 restrict the movement of the first shall body portions 54 and the second shaft restricting portions of the second terminals 30 restrict the movement of the second shaft body portions 55, thereby restricting the movement of the first shaft body portions 54, the second shaft body portions 55 (which are referred to collectively hereinbelow as "shaft body portions 54, 55" whenever necessary), and, by extension, the movable member 50 in a plane perpendicular to the connector width direction, which, as a result, makes it possible to prevent the detachment of the movable member 50.

The second contact arm portion 33, as illustrated in FIG. 3(B), extends slopingly downward as one moves rears ward through the upper groove portion 18B, and is resiliently displaceable in the up-down direction. A second contact portion 33A, which can be brought into contact with the second circuit C1A of the flat-type conductor C from above, is provided in a downwardly protruding configuration in the rear end portion of the second contact arm portion 33. The second contact portion 33A is positioned rearwardly of the first contact portion 24A of the first contact arm portion 24 of the first ten 20. The rear end face of the second terminals 30, which slopes downward as one moves forward, is formed as a second guide face 33A-1 used for forwardly guiding the flat-type conductor C. The bottom portion of the second guide face 33A-1 constitutes the rear end face of the second contact portion 33A.

The lower arm portion 34 has a retained arm portion 35 that extends toward the front from the bottom end of the strut portion 37, and a projecting arm portion 36 that extends toward the rear from the bottom end of the strut portion 37. As illustrated in FIG. 3(B), the retained arm portion 35, which is made shorter than the restricting arm portion 32 of the upper arm portion 31, is press-fitted from the rear into the press-fit groove portion 18A-2 of the second terminal accommodating portion 18 of the housing 10. An upwardly protruding press-fit protrusion 35A is formed in the front end portion of the retained arm portion 35, and the second terminals 30 are retained within the second terminal accommodating portions 18 due to the fact that said press-fit protrusions 35A bite into the bottom face of the second terminal retaining portions 18A-1.

Substantially the front half of the projecting arm portion 36 forms a rectilinear portion 36A that extends in a rectilinear manner in the forward-backward direction along the top face of the bottom wall 13. Substantially the rear half of the projecting arm portion 36 has a reinforcing portion 36B that is located rearwardly of the rear end of the bottom wall 13 and extends toward the rear and downward from the rectilinear portion 36A, and a second connecting portion 36C that extends rearwardly from the reinforcing portion 36B. The second connecting portion 36C is solder-connected to the circuits (not shown) on the mounting face of the circuit board with its bottom edge portion.

As illustrated in FIG. 3(B), a recess portion 36B-1 is formed in the top edge of the reinforcing portion 36B, within a range that includes the second contact portion 33A of the second contact arise portion 33 in the forward-backward direction. In the present embodiment, the gap between the second contact portion 33A and the reinforcing portion 36B in the up-down direction is increased by forming the recess portion 36B-1 in the reinforcing portion 36B, and, for this reason, in a punching die (not shown) used to form the second terminals 30 by punching from metal plate members, the section of the die used to form the above-mentioned gap can be made sufficiently large and adequate strength can be ensured in said section of the die.

The reinforcing portion 36B is made larger than the rectilinear portion 36A in the up-down direction, thereby avoiding a decrease in the strength of the reinforcing portion 36B itself due to the presence of the recess portion 36B-1. In addition, a front protrusion 36B-2 and a rear protrusion 36B-3, which protrude upwardly toward the receiving space 11 at the respective locations of the front and rear ends of the recess portion 36B-1, are formed at the top edge of the reinforcing portion 36B. The front protrusion 36B-2 is located forwardly of the second contact portion 33A, and the rear protrusion 36B-3 is located rearwardly of the second contact portion 33A. Therefore, once the flat-type conductor C has been inserted into the receiving space 11 and the second contact portion 33A has been brought into contact with the flat-type conductor C under contact pressure from above, the front protrusion 36B-2 and the rear protrusion 36B-3 support the flat-type conductor C from below. As a result, once pressure has been applied in the up-down direction at three points, i.e., the second contact portion 33A, the front protrusion 36B-2, and the rear protrusion 36B-3, the flat-type conductor C becomes securely clamped in the up-down direction, and inadvertent decoupling of the flat-type conductor C is prevented.

The bottom edge of the reinforcing portion 36B, which is positioned slightly above the bottom edge of the second connecting portion 36C, is adapted to avoid abutment against the mounting face of the circuit board when the connector 1 is disposed on said mounting face. Therefore, the second connecting portion 36C can be reliably connected to the circuits of the circuit board because a state in which the bottom edge of the reinforcing portion 36B would be located below the bottom edge of the second connecting portion 36C is unlikely to occur even if the bottom edge of the reinforcing portion 36B is located slightly downwardly of the normal design position because of fabrication errors.

The locking members 40, which are fabricated by punching from metal plate members while keeping their major faces (rolled surface) flat, are accommodated within the locking member accommodating portions 19 of the housing 10, as illustrated in FIG. 3(C), as a result of which the locking members 40 are retained in the housing 10 with their major faces at right angles to the connector width direction (Y-axis direction).

The locking members 40 are press-fittingly mounted to the housing 10 from the front. As illustrated in FIG. 3(C), the locking members 40 have an upper arm portion 41 that extends in the forward-backward direction along the top wall 12 upwardly of the receiving space 11, a mountable portion 44 that is mounted to the housing 10 downwardly of the upper arm portion 41, a strut portion 45 that extends upwardly from the mountable portion 44 and is coupled to the upper arm portion 41, and a projecting arm portion 46 that extends toward the front from the mountable portion 44.

The upper arm portion 41 has a pressure-receiving arm portion 42 that extends toward the front from the top end of the strut portion 45 and a kicking arm portion 43 that extends toward the rear from the top end of the strut portion 45. As illustrated in FIG. 3(C), the pressure receiving arm portion 42 has a curved shape extending in a crank-like configuration when viewed in the connector width direction, with its front end portion positioned downwardly of other parts to form pressure-receiving portion 42A. The pressure-receiving portions 42A, which are positioned with their top edges in contact with the pressure-applying portions 56A of the hereinafter-described cam portions 56 provided in the movable member 50, are adapted to be downwardly displaced under pressure applied from above by said pressure-applying portions 56A when the movable member 50 is brought to the open position (see FIG. 5(C)). In addition, in the present embodiment, the pressure-receiving portions 42A are located within the hounds of the shaft body portions 54 and 55 of the movable member 50 in the forward-backward and up-down directions.

The locking arm portion 43, which extends slopingly downward as one moves rearward through the upper groove portion 19B, is resiliently displaceable in the up-down direction. An engaging portion 43A is pro provided in a downwardly protruding configuration m the rear end portions of the locking arm portions 43. The engaging portions 43A are positioned so as to permit entry into the notched portions C2 of the flat-type conductor C from above and engagement with engageable portions C3A from the rear when the movable member 50 is in the closed position (see FIG. 4(C)). The rear end face of the engaging portions 43A, which slopes downward as one moves forward, is formed as an inclined face 43A-1 wised for forwardly guiding the flat-type conductor C.

The mountable portion 44, which has a rearwardly open recumbent U-shaped configuration, is accommodated within the front groove portion 19A located forwardly of the receiving space 11. The mountable portion 44 has an upper clamping portion 44A and a lower clamping portion 44B, which are spaced apart from each other in the up-down direction and extend in the forward-backward direction, and a coupling portion 44C that couples the (front end portions of the upper clamping portion 44A and the lower clamping portion 44B. The upper clamping portion 44A is resiliently displaceable in the up-down direction and, as illustrated in FIG. 3(C), the upper clamping portion 44A and lower clamping portion 44B clamp the mounting portion 13A of the housing 10 in the up-down direction.

The strut portion 45 extends upward from the upper clamping portion 44A at a location proximal of the rear end of the upper clamping portion 44A, and is coupled to the upper arm portion 41. The projecting arm portion 46, which is positioned at the same height in the up-down direction as the lower clamping portion 11B, extends forwardly from the front end of said lower clamping portion 448 and projects into the movable member accommodating space 16. The front end portion of the projecting arm portion 46, which is formed as an anchor portion 46A used for anchoring to the mounting face of the circuit board, is adapted to be anchored to the mounting face with the bottom edge portion of said anchor portion 46A using solder connections.

As illustrated in FIG. 1, the movable member 50 extends across the full width of the movable member accommodating space 16 in the connector width direction, with the entire movable member 50 accommodated within the movable member accommodating space 16 in the closed position. In FIG. 2, the movable member 50, which is in a closed-position orientation, is shown separated from the housing 10. As illustrated in FIG. 2, the movable member 50 has an actuating portion 51, end walls 52, partition walls 53, first shaft body portions 54, second shaft body portions 55, and cam portions 56.

As shown in FIG. 2, the actuating portion 51, which is formed on the front end side of the movable member 50 while extending, in the connector width direction, is adapted to receive actuating input for moving (pivoting) the movable member 50 between the closed position and the open position. The end walls 52 are provided in a rearwardly extending configuration from the opposite ends of the actuating portion 51 in the connector width direction. Multiple partition walls 53, which extend from the actuating portion 51 toward the rear between the two end walls 52 in the connector width direction, are formed in a side-by-side arrangement at spaced intervals in the connector width direction.

As shown in FIG. 2, the first shaft body portions 54, which are provided in the same positions as the first terminals 20 in the connector width direction, couple the opposed faces (faces perpendicular to the connector width direction) of the rear end portions (end portions on the X2 side) of two mutually adjacent partition walls 53. As shown in FIG. 3(A), the cross-sectional shape of the first shaft body portions 54 perpendicular to the connector width direction is a substantially square shape with rounded corners. In addition, as shown in FIG. 3(A), the first shaft body portions 54 are positioned in front of the retained portions 22 of the first terminals 20, above the supported arm portions 25A, and behind the protruding portions 25C with a slight gap from, respectively, the retained portions 22, the supported arm portions 25A, and the protruding portions 25C.

The second shaft body portions 55 are provided in the same positions as the second terminals 30 in the connector width direction and, as shown in FIG. 2, couple the opposed faces (faces perpendicular to the connector width direction) of the rear end portions (end portions on the X2 side) of two mutually adjacent partition walls 53. As shown in FIG. 3(B), the cross-sectional shape of the second shaft body portions 55 perpendicular to the connector width direction has a substantially rectangular configuration with rounded corners, whose longitudinal direction is the up-down direction. In addition, as shown in FIG. 3(13), along with having their bottom faces supported by the bottom wall 13 of the housing 10, the second shaft body portions 55 are positioned below the second shaft restricting portions 32A of the second terminals 30 with a slight gap from said second shaft restricting portions 32A.

The cam portions 56 are provided in the same positions in the connector width direction as the locking members 40 and, as shown in FIG. 2, couple the opposed faces aces perpendicular to the connector width direction) of the most outward partition walls 53 in the connector width direction and the end walls 52 adjacent to said partition walls 53. As shown in FIG. 3(C), the cam portions 56 extend in the forward-backward direction, and, along with having their front end portions coupled to the bottom portion of the actuating portion 51, have a rear edge of a circular actuate shape. The cam portions 56 are positioned upwardly of the pressure-receiving portions 42A of the pressure-receiving arm portions 42 of the locking members 40 and downwardly of the rear half of the pressure-receiving arm portions 42 (sections extending in the forward-backward direction). The rear end portions of the cam portions 56 are formed as pressure-applying portions 56A capable of applying pressure to the pressure-receiving portions 42A from above, and the bottom faces of the pressure-applying portions 56A are brought into contact with the pressure-receiving portions 42A. In the present embodiment, the pressure-applying portions 56A are located within the bounds of the first shaft body portions 54 and second shaft body portions 55 in the up-down and forward-backward directions.

The pivotal center O, through which the pivotal axis of the movable member 50 passes, is shown in each view of FIGS. 3(A) to 3(C). As shown in FIG. 3(A), sit the location of the first shaft body portions 54 in the connector width direction, the pivotal center O is positioned slightly forwardly of the substantially central portion of the first shall body portions 54 when viewed in the connector width direction. As shown it FIG. (B), at the location of the second shall body portions 55 in the connector width direction, the pivotal center O is positioned slightly to the front in the top portion of the second shaft, body portions 55 when viewed in the connector width direction. As shower FIG. 3(C), at the location of the cam portions 56 in the connector width direction, the pivotal center O is positioned the point of contact between the pressure-applying portions 56A of the cam portions 56 and the pressure-receiving portion 42A.

In the present embodiment, positioning the pressure-receiving portions 42A formed in the front end portions of the pressure-receiving arm portions 42 of the locking members 40 downwardly of the other parts of the pressure-receiving arm portions 42 makes it possible to provide the cam portions 56 of the movable member 50 in a lower position in comparison with forming the entire pressure-receiving arm portion 42 in a rectilinear manner even though the cam portions 56 of the movable member 50 are located above the pressure-receiving portions 42A, and, as a result, makes it possible to achieve a reduction in the profile, i.e., miniaturization in the up-down direction, of the connector 1.

In addition, in the present embodiment, positioning the pressure-applying portions 56A of the cam portions 56 in the movable member 50 within the hounds of the shaft body portions 54 and 55 in the tip-down direction achieves a reduction the profile of the movable member 50 and, by extension, the connector 1 in comparison with positioning the pressure-applying portions 56A outside the range of the shaft body portions 54 and 55 in the up-down direction. Further, since the pressure-applying portions 56A of the cam portions 56 are located within the bounds of the shaft body portions 54 and 55 in the up-down direction, the pressure-applying portions 56A are located in the vicinity of the pivotal axis, in other words, pivotal center O of the movable member 50. Therefore, it becomes easy to apply pressure to the pressure-receiving portions 42A with the pressure-applying portions 56A from above without maximizing the size of the cam portions 56.

At such time, the closer the pressure-applying portions 56A are to the pivotal axis, the greater the force (pressure force) required to depress the pressure-receiving portions 42A with the pressure-applying portions 56A when moving the movable member 50 from the closed position to the open position during the unlocking operation. However, in the present embodiment, the locking members 40 are disposed only on opposite external sides of the terminal array range and the number of the provided locking members 40 is small. Furthermore, in the process of pivoting of the movable member, the first shaft restricting portions 20A of the first terminals 20 do not come into contact with the first shaft body portions 54 of the movable member 50 and no contact pressure is generated therebetween. In addition, in the process of pivoting of the movable member 50, the second shaft restricting portions 32A of the second terminals 30 are only temporarily lifted up by the corner portions 55A of the second shaft body portions 55, and the duration of the contact pressure therebetween is therefore short. As a result, the actuating force unlocking actuating force) required to move the movable member 50 from the closed position to the open positron is decreased, which makes it possible to easily perform the unlocking operation even if the above-mentioned pressure force increases during the unlocking operation.

Although in the present embodiment the movable member 50 is adapted to move between the closed position and the open position simply by pivoting about a pivotal axis extending in the connector width direction, the way of movement of the movable member 50 is not limited thereto, and it may, for example, be adapted to pivot in combination with sliding movement.

The connector 1 is assembled in accordance with the following procedure. First, the first terminals 20 and the locking members 40 are mounted to the housing 10 from the front. Specifically, the base portions 21 of the first terminals 20 are press fitted into the front groove portions 17A of the housing 10 (see FIG. 3(A)), and the mounting portions 13A of the housing 10 are clamped by the mountable portions 44 of the locking members 40 (see FIG. 3(C)). The first terminals 20 and the locking members 40 may be mounted either one after the other, or at the same time.

Next, the movable member 50 is disposed in the movable member accommodating space 16 of the housing 10. Specifically, the first shaft body portions 54 are disposed in the spaces surrounded by the first shaft restricting portions 20A formed by the front end portions of the retained portions 22 of the first terminals 20, the supported arm portions 25A and the protruding portions 25C (see FIG. 3(A)), the second shaft body portions 55 are disposed the top face of the front end portion of the bottom wall 13 (see FIG. 3(B)), and the pressure-applying portions 56A of the cam portions 56 are disposed on the pressure-receiving portions 42A of the locking members 40 (see FIG. 3(C)). Next, the second terminals 30 are mounted to the housing 10 from the rear. Specifically, the retained arm portions 35 of the second terminals 30 are press-fitted into the press-fit groove portions 18A-2 of the housing 10 from the rear (see FIG. 3(B)). As a result, the second shaft restricting portions 32A of the second terminals 30 are positioned immediately above the second shaft body portions 55 of the movable member 50. Therefore, the movement of the shaft body portions 54, 55 in a plane perpendicular to the connector width direction is restricted by the first shaft restricting portions 20A of the first terminals 20 and the second shaft restricting portions 32A of the second terminals 30 and, as a result, detachment of the movable member 50 from the housing 10 is adequately prevented. The mounting of the first terminals 20, the second terminals 30, the locking members 40, and the movable member 50 to the housing 10 in this manner completes the assembly of the connector 1.

In the present embodiment, an inspection to confirm whether the vertical dimensions of the gap through which the flat-type conductor C enters at the location of the first contact portions 24A of the first terminals 20 are properly ensured or not is carried out upon completion of assembly of the connector 1. With respect to the first terminals 20, the term gap, as used herein, refers to the vertical dimensions of the space between the first contact portions 24A and the top face of the bottom wall 13 of the housing 10 facing the same, which is designated as δ1 in FIG. 3(A).

The inspection device (not shown) used for inspection, which is provided behind the connector 1, has an emitting portion (not shown) that emits light forwardly toward the receiving space 11 of the housing 10, an imaging portion (not shown) that captures images (inspection images) of the connector 1 as seen from the rear, and a measuring portion (not shown) that analyzes the captured inspection images and measures the vertical dimensions of the gap δ1.

At the time of inspection, when light is emitted forwardly from the emitting portion toward the receiving space 1, the light that reaches the reflecting surfaces 23A-1 of the first terminals 20 is reflected back, i.e., toward the rear end opening 11A, by said reflecting surfaces 23A-1. In the present embodiment, the first guide faces 24A-1, which constitute the rear end faces of the first terminals 20, are inclined faces sloping downward as one moves forward, and the light that reaches the first guide faces 24A-1 is unlikely to be reflected toward the rear end opening 11A.

Therefore, in the inspection images captured by the imaging portion, the first contact portions 24A become darker, and the reflecting surfaces 23A-1 become lighter. In other words, clear inspection images with high contrast between the first contact portions 24A and the reflecting surfaces 23A-1 are obtained. As a result, the location of the protruding ends (bottom ends) of the first contact portions 24A in the inspection images can be easily determined, which makes it possible for the measuring portion to precisely measure the vertical dimensions of the gap δ1.

In the present embodiment, positioning the reflecting surfaces 23A-1 within a range that includes the entire gap δ1 as previously discussed makes it possible for light emitted forwardly toward the receiving space 11 to be adequately reflected back by the reflecting surface 23A-1. In addition, since the reflecting surfaces 23A-1 are formed as surfaces perpendicular to the forward-backward direction in the forward-backward direction, light can be reflected back by the reflecting surfaces 23A-1 in a more adequate manner.

In addition, in the present embodiment, the reflective portions 23A are formed in the rear end portions of the extension portions 21 extending toward the rear from the retained portions 22, which makes it possible to dispose the reflecting surfaces 23A-1 closer to the first contact portions 24A in the forward-backward direction. In other words, given the constraint that the reflecting surfaces 23A-1 are disposed forwardly of the first contact portions 24A, the reflecting, surfaces 23A-1 can be disposed as rearwardly as possible, in other words, at locations close to the rear end opening 11A of the receiving space 11. Therefore, even though the rear end opening 11A of the receiving space 11 is small, light emitted forwardly toward the receiving space 11 is likely to reach the reflecting surfaces 23A-1 and a sufficient quantity of light can be reflected back by the reflecting surfaces 23A-1. As a result, it becomes easy to capture clear inspection images with high contrast between the first contact portions 24A and the reflecting surfaces 23A-1 and determine the location of the first contact portions 24A, which makes it possible to accurately measure the dimensions of the gap δ1.

Although in the present embodiment the extension portions 23 provided with the reflective portions 23A are arm-shaped sections that extend toward the rear from the rear ends of the retained portions 22, the form of the extension portions is not limited thereto. For example, the extension portions may be arm-shaped sections of a substantially L-shaped configuration that extend downward from the bottom edge of the front end sections of the contact arm portions 24 and then extend further rearward. In such a case, the reflective portions are formed in the rear end portions of the rearwardly extending sections, and the reflecting surfaces are formed on the rear end faces of said rear end portions. In addition, the extension portions may be arm-shaped sections or protrusion-shaped sections that extend downward from the bottom edges of the front end sections of the contact arm portions 24. In such a case, the reflective portions are formed in the bottom end portions of the extension portions, and the reflecting surfaces are formed on the rear end faces of said bottom end portions.

In addition, although in the present embodiment the reflecting surfaces 23A-1 are located within a range that includes the entire gap δ1, it is not essential for the reflecting surfaces 23A-1 to be located within a range that includes the entire gap 61 as long as sufficient reflected light can be obtained to determine the location of the first contact portions 24A. For example, the reflecting surfaces 23A-1 may be provided within a range that overlaps with a portion of the gap 61 while including the protruding ends of the contact portions, in addition, although in the present embodiment the reflecting surfaces 23A-1 are flat surfaces perpendicular to the forward-backward direction, it is not essential for the reflecting surfaces 23A-1 to be surfaces perpendicular to the forward-backward direction as long as sufficient reflected light can be obtained to determine the location of the first contact portions 24A, and these surfaces may be, for example, somewhat curved or somewhat inclined.

The operations of insertion and extraction of the flat-type conductor C into and from the connector 1 will be described below.

First, the first connecting portions 25B of the first terminals 20 and the second connecting portions 36C of the second terminals 30 of the connector 1 are solder-connected to the corresponding circuits of the circuit hoard (not shown) and the anchor portions 46A of the locking members 40 are solder-connected to the corresponding portions of the circuit board. The connector 1 is mounted to the circuit board using the solder connections of these first connecting portions 25B, second connecting portions 36C, and anchor portions 46A.

Next, as shown in FIG. 1, the flat-type conductor C is positioned so as to extend parallel to the mounting face of the circuit board (not shown) in the forward-backward direction (X-axis direction) behind the connector 1, in which the movable member 50 has been brought to the closed position. Next, the flat-type conductor C is inserted into the receiving space 11 of the connector 1 in the forward direction (X1 direction).

In the process of insertion of the flat-type conductor C into the receiving space 11, the front end of the flat-type conductor C, first, resiliently displaces the second contact arm portions 33 upward by abutting the second guide faces 33A-1 of the second contact portions 33A of the second terminals 30 and pushing the second contact portions 33A upward under the action of the upward component of the abutment force. As the flat-type conductor C is inserted further forward while being guided by the second guide faces 33A-1, the front end of said flat-type conductor C resiliently displaces the first contact arm portions 24 upward by abutting the first guide faces 24A-1 of the first contact portions 24A of the first terminals 20 and pushing said first contact portions 24A up. The flat-type conductor C is inserted further forward while being, guided by the first stride faces 24A-1.

As illustrated in FIGS. 4(A) and 4(B), even upon complete insertion of the flat-type conductor C, the first contact arm portions 24 of the first terminals 20 and the second contact arm portions 33 of the second terminals 30 remain resiliently displaced. As a result, a state is maintained in which the first contact portions 24A and the second contact portions 33A have been brought into contact with, respectively, the first circuit C1A and the second circuit C1B (see FIG. 1) of the flat-type conductor C under contact pressure.

In addition, in the process of insertion of the flat-type conductor C into the receiving space 11, specifically, when the front end of the flat-type conductor C passes the location of the second contact portions 33A and before it reaches the location of the first contact portions 24A, the ear portions C3 located proximal of the opposite ends of the flat-type conductor C in the width direction abut the inclined laces 43A-1 of the engaging portions 43A formed in the locking arm portions 43 of the locking members 40. Then, as the flat-type conductor C is inserted further forward while being guided by the inclined faces 43A-1, the engaging portions 43A are lifted up under the action of the vertical component of the force of abutment against the inclined facces 43A-1.

In the present embodiment, the locking arm portions 43, strut portions 45, and upper clamping portions 44A of the locking members 40 are resiliently displaceable, and the spring length is the length of the range encompassing these sections. Therefore, when the ear portions C3 of the flat-type conductor C lift the engaging portions 43A, the locking arm portions 43, strut portions 45, and upper clamping portions 44A effect rocking motion about the coupling portions 44C of the mountable portions 44 as fulcra and are resiliently displaced upward (Z1 direction), and, as a result, further insertion of the flat-type conductor C is permitted.

When the flat-type conductor C is inserted further forward and the ear portions C3 pass the location of the engaging portions 43A, the locking arm portions 43 are displaced downward (Z2 direction) such that the amount of resilient displacement is reduced and they return to a free state, thus push-fitting into the notched portions C2 of the flat-type conductor C. As a result, the engageable portions C3A of the flat-type conductor C are positioned so as to permit engagement with the engaging portions 43A forwardly of said engaging portions 43A, and rearward extraction of the flat-type conductor C is prevented (see FIG. 4(C)). It should be noted that it is not essential for the locking arm portions 43 to go back to a completely free state. For example, it is possible to use a configuration in which the engaging portions 43A are positioned so as to permit engagement with the engageable portions is C3A by push-fitting into the notched portions C2 of the flat conductor C while a certain amount of residual resilient displacement remains in the locking arm portions 43.

The operation if insertion of the that-type conductor C is complete when, as shown in FIG. 4(A-C), the front end of the flat-type conductor C abuts the front wall 15 of the housing 10.

When the flat-type conductor C in the condition illustrated in FIGS. 4(A to 4(C), that is, connected to the connector 1, is intentionally extracted from the connector 1, the movable member 50 in the closed position is pivoted, which brings it to the open position illustrated in FIGS. 5(A) to 5(C). Due to the fact that the pressure-applying portions 56A of the cam portions 56 of the movable member 50 push the pressure-receiving portions 42A of the locking members 40 down as the movable member 50 moves to the open position, the locking arm it 43, strut portions 45, and upper clamping portions 44A are resiliently displaced upward as previously discussed in connection with the operation of insertion of the flat-type conductor C. As a result, the engaging portions 43A of the locking arm portions 43 of the locking members 40 are upwardly detached from the notched portions C2 of the flat-type conductor C. The state of detachment of the engaging portions 43A from the notched portions C2 is maintained even after bringing the movable member 50 to the open position, as a result of which the engaging portions 43A are disengaged from the engageable portions C3A of the flat-type conductor C and extraction of the flat-type conductor C is permitted. The flat-type conductor C is then easily extracted from the connector 1 by pulling said flat-type conductor C toward the rear (X2 direction), and the extraction operation is complete.

Figure 5:
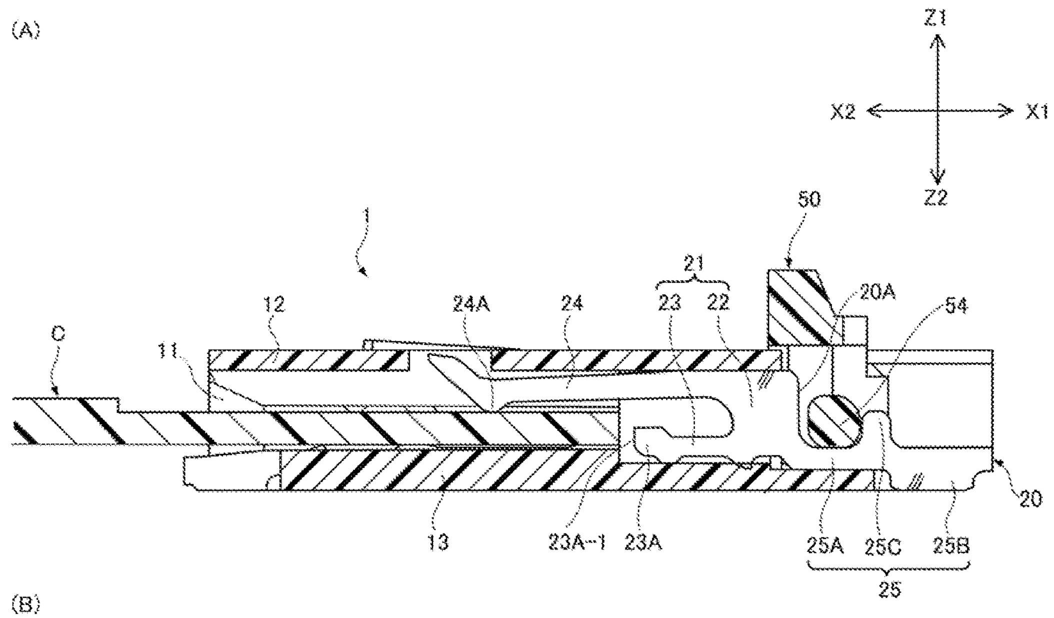
FIGS. 5(A) to 5(C) illustrate a longitudinal cross-sectional view of the electrical connector for flat-type conductors immediately prior to removal of the flat-type conductor, wherein FIG. 5 (A) illustrates a cross-section at the location of a first terminal, FIG. 5(B) a cross-section at the location of a second terminal, and FIG. 5(C) a cross-section at the location of a locking member.
Figure 5:
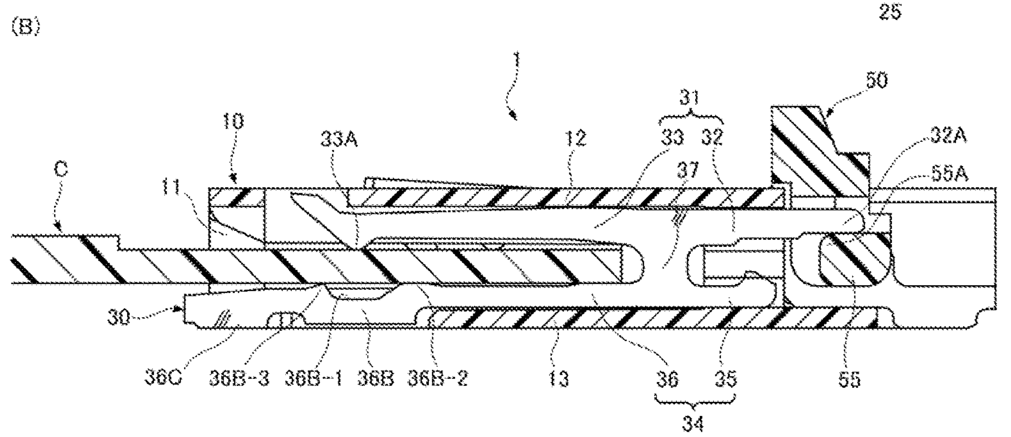
Figure 5:
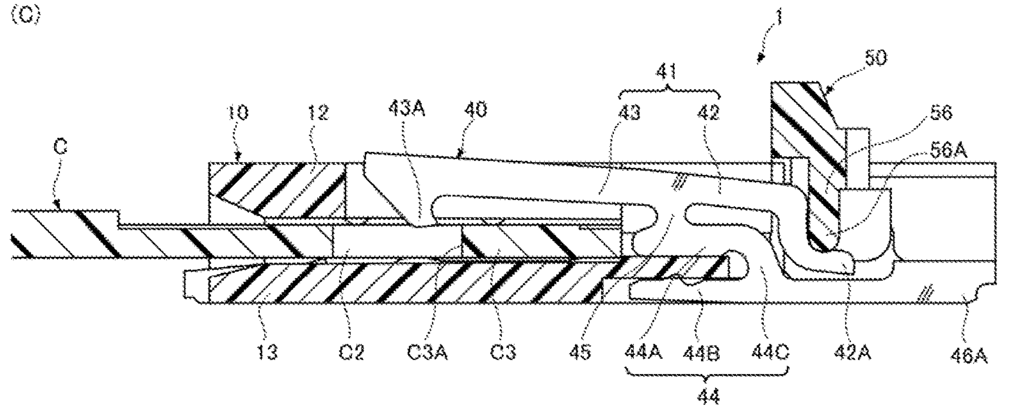

As the movable member 50 is pivoted from the closed position to the open position, the first shaft body portions 54 of the movable member 50 do not come into contact with the first shaft restricting portions 20A made up of the front end portions of the retained portions 22 of the first terminals 20, the supported arm portions 25A, and the protruding portions 25C. On the other hand, in the second shaft body portions 55 of the movable member 50, immediately after the movable member 50 starts pivoting toward the open position, the corner portions 55A of the second shaft body portions 55 abut the second shaft restricting portions 32A from below and bring said second shaft restricting portions 32A to a state of resilient displacement by slightly lifting them up. Then, as the movable member 50 pivots further and reaches the open position, as illustrated in FIG. 5 (B), the second shaft restricting portions 32A are brought out of the state of resilient displacement, supporting and contacting the corner portions 55A of the second shaft body portions 55 from above.

In addition, since in the present embodiment, as previously discussed, resilient displacement is made possible not only in the locking arm portions 43 and strut portions 45, but also in the upper clamping portions 44A of the mountable portions 44, a longer spring length is correspondingly ensured in addition, since the upper clamping portions 44A, which form part of the mountable portions 44 used for mounting the locking members 40 to the housing 10, are used as resiliently displaceable sections, there is no need to provide new sections in the locking members 40 or make the locking arm portions 43 and strut portions 45 longer in order to increase the spring length, and no increase in the size of the connector 1 occurs.

Although in the present embodiment, the upper clamping portions 44A of the mountable portions 44 of the locking members 40 are resiliently displaced upward along with the locking arm portions 43 and the strut portions 45 in the process of insertion and extraction of the flat-type conductor C, the lower clamping portion 44B is not resiliently displaced upward. Therefore, since the upper clamping portion 44A and the lower clamping portion 44B in the mountable portion 44 are spaced apart because only the upper clamping portion 44A is displaced upward, the clamping force applied by the mountable portion 44 to the mounting portion 13A of the housing 10, i.e., the strength of attachment of the mountable portion 44, may be somewhat decreased.

However, the operations of insertion and extraction of the flat-type conductor C are performed alter mounting the connector 1 to the mounting face of the circuit board, i.e., after anchoring the anchor portions 46A of the locking members 40 to the mounting face of the circuit board using solder connections. Therefore, even though the upper clamping portions 44A and the lower clamping portions 44B of the mountable portions 44 are spaced apart and the clamping, force is somewhat decreased, the locking members 40 do not become detached from the housing 10 because the locking members 40 are already anchored to the circuit board at this point in time.

In addition, although in the present embodiment the lower clamping portion 44B is not resiliently displaced upward when the upper clamping portion 44A of the mountable portion 44 is resiliently displaced upward, as an alternative, both the upper clamping portion 44A and the lower clamping portion 44B may be resiliently displaced upward. By doing so, the condition is which the mounting portion 13A of the housing 10 is clamped by the upper clamping portion 44A and the lower clamping portion 44B is maintained even in the state of resilient displacement. As a result, the decrease in the strength of attachment of the mountable portion 44 to the housing 10 can be minimized.

Although in the present embodiment the locking members 40 are provided with mountable portions 44 having upper clamping portions 44A, lower clamping portions 44B, and coupling portions 44C, and the upper clamping portions 44A are resiliently displaceable along with the locking arm portions 43 and the strut portions 45, as long as the magnitude of the unlocking actuating force is kept to an acceptable level, the spring length of the terminals can be increased by adopting a configuration similar to that of the locking members 40 for at least one type of terminal from it among the first terminals and second terminals.

If a configuration similar to that of the locking members 40 is applied to the terminals, said terminals are provided with upper arm portions, mountable portions, strut portions, and connecting portions (anchor portions). In addition, the upper art portions are provided with a pressure-receiving arm portion that extends forwardly from the top end of the strut portion and has a pressure-receiving portion furred in the front end portion, and a contact arm portion that extends rearwardly from the top end of the strut portion and has a contact portion formed in the rear end portion. Furthermore, above the pressure-receiving portions of the pressure-receiving arm portions, the movable member is provided with cam portions similar to the earn portions 56 and the movable member 50 of the present embodiment.

If the terminals are configured in this manner, as the movable member moves to the open position when the flat-type conductor is extracted, the cam portions of the movable member depress the pressure-receiving portions, and the contact arm portions, strut portions, and upper clamping portions of the mountable portions are resiliently displaced upward. As a result, contact between the contact portions of the contact arm portions and the circuits of the flat-type conductor is broken.

Even though the spring length is increased with the terminals configure in this manner, no increase in the size of the connector occurs and, in addition, even though the strength of attachment of the mountable portion to the housing is somewhat reduced, the terminals do not become detached from the housing in the same manner as described above for the locking members 40.

DESCRIPTION OF THE REFERENCE NUMERALS

1 Connector
10 Housing
11 Receiving space
11A Rear end opening
13A Mounting portion
20 First terminal
20A First shaft restricting portion
21 Base portion
22 Returned portion
23 Extension portion
23A Reflective portion
23A-1 Reflecting surface
24 First contact arm portion
24A First contact portion
25B First connecting portion (anchor portion)
30 Second terminal
31 Upper arm portion
32A Second shaft restricting portion)
33 Second contact arm portion
33A Second contact portion
34 Lower arm portion
36 Projecting arm portion
36B-1 Recess portion
36B-2 Front protrusion
36B-3 Rear protrusion
36C Second connecting portion (anchor portion)
37 Strut portion
40 Locking, member
41 Upper arm portion
42 Pressure-receiving arm portion
42A Pressure-receiving portion
43 Locking arm portion
43A Engaging portion
44 Mountable portion
44A Upper clamping portion
44B Lower clamping portion
44C Coupling portion
45 Strut portion
46A Anchor portion
50 Movable member
54 First shaft body portion
55 Second shaft body portion
56 Cam portion
56A Pressure-applying portion
C Flat-type conductor
C1 Connecting circuit
C1A First circuit
C1B Second circuit
C3A Engageable portion
O Pivotal center
δ1 Gap

The invention claimed is:

1. An electrical connector for flat-type conductors to which a flat-type conductor extending in a forward-backward direction and dimensionally thick in an up-down direction is connected, said connector comprising;

a housing that has formed therein a receiving space open toward a rear for forward insertion of the flat-type conductor, multiple terminals that are arranged and retained in the housing such that a terminal array direction is a direction perpendicular to both the forward-backward direction and the up-down direction, locking members that are disposed outside an array range of the terminals in the terminal array direction and retained in the housing, and a movable member that is provided forwardly of the receiving space and is capable of moving between a closed position and an open position while pivoting about a pivotal axis extending in the terminal array direction, with extraction of the flat-type conductor being prevented when the movable member is in the closed position and extraction of the flat-type conductor being permitted when the movable member is in the open position, wherein the locking members have an upper arm portion that extends in the forward-backward direction upwardly of the receiving space, a mountable portion that is mounted to the housing at a location downward of the upper arm portion and forward of the receiving space, and a strut portion that extends upwardly from the mountable portion and is coupled to the upper arm portion;

the upper arm portion has a pressure-receiving arm portion that extends forwardly from a top end of the strut portion, and a locking arm portion that extends rearwardly from the top end of the strut portion;

the locking arm portion has an engaging portion positioned so as to permit engagement from the rear with an engageable portion in the flat-type conductor when the movable member is in the closed position;

the mountable portion has an upper clamping portion and a lower clamping portion that are spaced apart from each other in the up-down direction and extend in the forward-backward direction, and a coupling portion that couples front end portions of the upper clamping portion and lower clamping portion, with the upper clamping portion, which is positioned forward of the receiving space, being resiliently displaceable in the up-down direction by effecting rocking motion about the coupling portion of the mountable portion as a fulcrum, and a mounting portion, formed as part of the housing, being clamped by the upper clamping portion and lower clamping portion in the up-down direction;

the strut portion extends upward from the upper clamping portion, the movable member has cam portions located above the pressure-receiving arm portions, and the cam portions depress the pressure-receiving arm portions downward when the movable member moves from the closed position to the open position.

2. The electrical connector for flat-type conductors according to claim 1, wherein the electrical connector for flat-type conductors is mountable to a mounting face of a circuit board using solder connections, and the locking members have an anchor portion that extends toward the front from the mountable portion and is anchored to the mounting face of the circuit board using solder connections.

3. The electrical connector according to claim 1, wherein the coupling portion is configured as a living hinge that enables the upper clamping portion to rock about the coupling portion while maintaining the clamping relationship with the mounting portion of the housing.

4. The electrical connector according to claim 1, wherein the coupling portion has a reduced thickness compared to the upper and lower clamping portions to facilitate elastic deformation during the rocking motion of the upper clamping portion.

5. The electrical connector according to claim 1, wherein the upper clamping portion, strut portion, and upper arm portion are configured to move together as a single unit when effecting the rocking motion about the coupling portion as the fulcrum.

6. An electrical connector for flat-type conductors to which a flat-type conductor extending in a forward-backward direction and dimensionally thick in a up-down direction is connected, said connector comprising:

a housing that has formed therein a receiving space open toward a rear for forward insertion of the flat-type conductor, multiple terminals that are arranged and retained in the housing such that a terminal array direction is a direction perpendicular to both the forward-backward direction and the up-down direction, and a movable member that is provided forwardly of the receiving space and is capable of moving between a closed position and an open position while pivoting about a pivotal axis extending in the terminal array direction, wherein the terminals have an upper arm portion that extends in the forward-backward direction upwardly of the receiving space, a mountable portion that is mounted to the housing at a location downward of the upper arm portion and forward of the receiving space, and a strut portion that extends upwardly from the mountable portion and is coupled to the upper arm portion;

the upper arm portion has a pressure-receiving arm portion that extends forwardly from a top end of the strut portion, and a contact arm portion that extends rearwardly from the top end of the strut portion:

the contact arm portion has a contact portion that comes into contact with circuits of the flat-type conductor from above when the movable member is in the closed position;

the mountable portion has an upper clamping portion and a lower clamping portion that air spaced apart from each other in the up-down direction and extend in the forward-backward direction, and a coupling portion that couples front end portions of the upper clamping portion and lower clamping portion, with the upper clamping portion, which is positioned forward of the receiving space, being resiliently displaceable in the up-down direction by effecting rocking motion about the coupling portion of the mountable portion as a fulcrum, and a mounting portion, formed as part of the housing, being clamped by the upper clamping portion and lower clamping portion in the up-down direction;

the strut portion extends upward from the upper clamping portion;

the movable member has cam portions located above the pressure-receiving arm portions; and the cam portions depress the pressure-receiving arm portions downward when the movable member moves from the closed position to the open position.

7. The electrical connector for flat-type conductors according to claim 6, wherein the electrical connector for flat-type conductors is mountable to a mounting face of a circuit board using solder connections, and the terminals have an anchor portion that extends toward the front from the mountable portion and is anchored to the mounting face of the circuit board using solder connections.

* * * * *